United States Patent [19]

Curry, Jr.

[11] 3,811,068

[45] May 14, 1974

[54] PROTECTION CIRCUIT FOR CATHODE RAY TUBES

[75] Inventor: Robert G. Curry, Jr., Severna Park, Md.

[73] Assignee: Westinghouse Electric Corporation, Pittsburgh, Pa.

[22] Filed: Dec. 30, 1971

[21] Appl. No.: 214,285

[52] U.S. Cl. .................................................. 315/20
[51] Int. Cl. .............................................. H01j 29/70
[58] Field of Search ........ 315/20, 30, 28, 29, 27 TD

[56] References Cited

UNITED STATES PATENTS

| | | | |
|---|---|---|---|
| 3,501,670 | 3/1970 | Johnston et al. | 315/20 |
| 3,374,391 | 3/1968 | Friess | 315/20 |

OTHER PUBLICATIONS

IBM Technical Disclosure "CRT Protection & Analog Check System," Vol. 8, No. 3, 8/65, pg. 421.

*Primary Examiner*—Maynard R. Wilbur
*Assistant Examiner*—J. M. Potenza
*Attorney, Agent, or Firm*—C. L. O'Rourke

[57] ABSTRACT

Described is a protective circuit for an electron beam device which gives a failure indication when the sweep signal fails and the electron beam is not properly deflected across the target. The circuit includes a bi-stable device which is set in a first output state in response to the unblank signal of the electron beam device and reset to a second output state in response to a sweep detection signal generator. The signal generator is triggered only when the sweep signal exceeds a predetermined threshold. When the signal generator is not triggered the bi-stable device is not reset and remains in its first output state. Output circuitry provides an output failure signal responsive to the bi-stable device when it remains in its first output state for the entire unblank portion of the unblank signal. A gate in feedback relationship to the output circuitry prevents a false failure indication.

12 Claims, 3 Drawing Figures

PROTECTION CIRCUIT FOR CATHODE RAY TUBES

BACKGROUND OF THE INVENTION

1. Field of the Invention

The present invention relates generally to the protection of electron beam devices having targets, such as cathode ray tubes, upon failure of beam deflection signals and more particularly to a simple logic protective circuit for rapid indication of such failure.

2. Discussion of the Prior Art

Failure to deflect a cathode ray tube (CRT) electron beam during the unblank cycle can result in destruction of the screen or other beam target. The amount of permanent damage which can be done is a function both of the total time the undeflected beam is concentrated on a single spot and of the intensity of the beam. Electronic means of sensing such a failure are necessary the time required by an operator to take corrective action after visually observing the occurrence of a failure would be excessive and permanent damage would be done to the target.

One technique presently used depends on the discharging of a capacitor after the completion of each sweep. A capacitor is discharged to a negative voltage during a time interval determined by a fixed one-shot monostable multivibrator which provides a fixed-width pulse output to the capacitor. Following the discharge cycle the capacitor charges towards some threshold value which can be a few tenths of a volt positive. The succeeding sweep triggers the one-shot multivibrator which discharges the capacitor before the threshold is reached. Should a succeeding sweep fail to be generated, the threshold voltage on the capacitor will be exceeded thereby causing protective action to be initiated.

However, the duty cycle of the fixed width pulse supplied by the multivibrator and the charging time constant associated with the capacitor are frequency dependent. This limitation prevents this type of protective circuit from causing protective action to be initiated before several unblank cycles occur when operating a multimode display at a frequency other than the lowest operating frequency. In a multimode display application, false failure indication usually occurs in the event of a momentary loss of the unblank signal during range selection, i.e., selecting the displayed distance, due to an excessive disruption in the occurrence of the fixed pulse width supplied by the multivibrator.

Another technique has been to use a monostable multivibrator which is switched between the stable state and quasi-stable state by trigger pulses responsive to the sweep deflection voltage. If the sweep voltage fails, the multivibrator will either remain in a stable state or return to that state and provide a suitable potential on a grid of the CRT to cut off the electron beam. Such a protective circuit requires a separate multivibrator for each axis and does not respond to failure of the accelerating circuitry which could cause the beam to be continuously, rather than intermittently, unblanked to thus also cause excessive dissipation and burning. See, for instance, U.S. Pat. No. 3,308,333.

Another prior method uses a Schmitt trigger circuit to sense the loss of the sweep voltage or a decrease in the repetition rate of the sweep voltage below a preselected frequency. A control circuit coupled to the output of the Schmitt trigger causes a failure indication, such as an output pulse from a pulse generator, to disable the electron beam source when the sweep voltage fails. However, this circuit too is frequency dependent and the RC time constant of the time control circuit must be adjusted for varying speed repetition rates and sweep times. See for instance, U.S. Pat. No. 3,374,391.

Another prior protective circuit for CRTs utilizes an OR gate in a manner such that a failure in any of several circuits which could damage the targer results in a gated signal which causes protective action to be taken to blank the beam. This technique, can however, give a false failure indication in the event of a momentary loss of the unblank signal during range selection as discussed above. This technique is described in U.S. Pat. No. 3,437,872.

Another method of providing protection for a CRT uses a comparator circuit to obtain a signal representative of the maximum amplitude of the sweep voltage in a relay to disable the high voltage circuit of the CRT when that signal drops below a predetermined level. This type of protective circuit can be used for both the positive and negative sawtooth voltages generated by the sweep generator with the output fed to an AND gate and then to a relay or other protection initiating circuitry. Again, this type of circuit has the disadvantage of being frequency dependent. See, for instance, U.S. Pat. No. 3,164,746.

SUMMARY OF THE INVENTION

The protection circuit for an electron beam device of this invention includes bi-stable means responsive to the unblank portion of the unblank signal for initially assuming a first output state, means to detect the sweep signal providing a detection signal only when the sweep signal exceeds some predetermined threshold, the bistable means then being responsive to the detection signal to reset to a second output state, and circuit means for providing an output failure signal if the bi-stable means remains in the first output state during the entire unblank portion of the unblank signal.

BRIEF DESCRIPTION OF THE DRAWINGS

Like reference characters will be used to identify like components in the various figures of the drawing.

DESCRIPTION OF THE INVENTION

Figure 1:
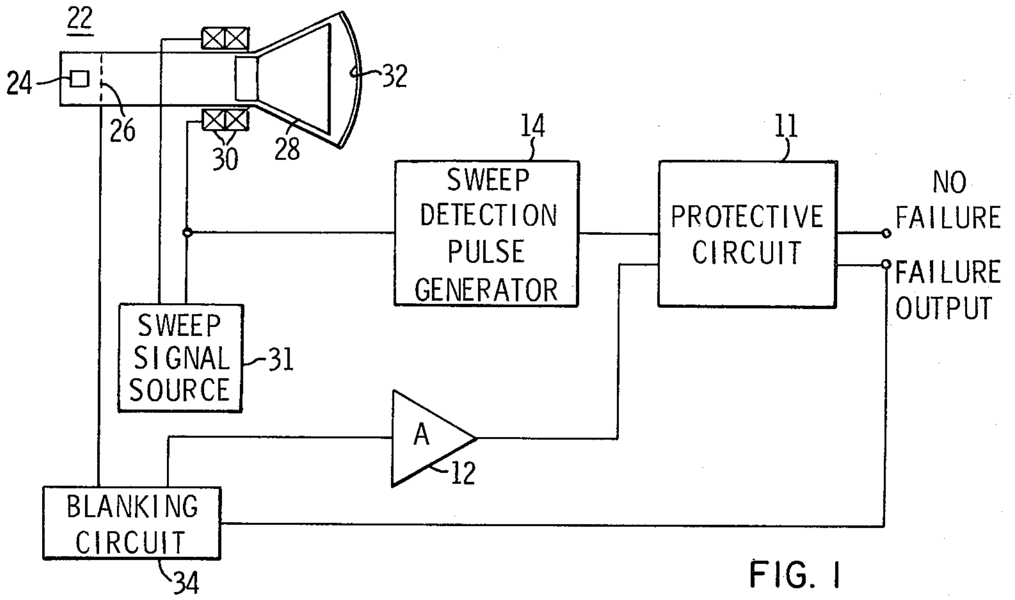
FIG. 1 is a block diagram of an electron beam device and associated circuits utilizing the protective circuit of the present invention.
Figure 3:
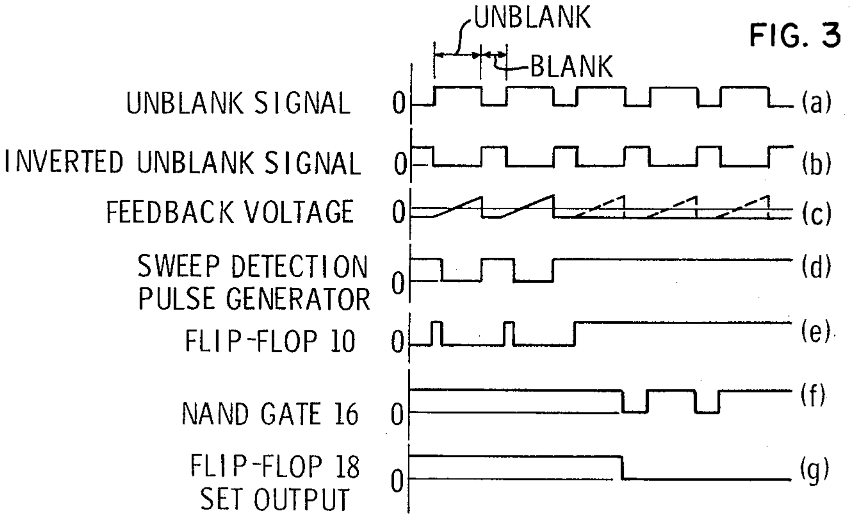
FIG. 3 (a)–(g) illustrates voltage waveforms at various points in the circuit of FIG. 2.

The electron beam device 22 of FIG. 1 has a cathode 24, a control grid 26, accelerating anode 28 and a target 32 which can be a screen. Deflection coils 30 are positioned in contiguous relationship to the electron beam device 22 so as to set up a magnetic field at right angles to the axial direction of the electron beam when current flows in the coils. By applying a sweep signal from the sweep signal source 31 to the deflection coils 30, such a signal having for instance a sawtooth waveform, deflection of the electron beam can be accomplished. Control of the beam, in the sense of actually turning it on (unblanking) or turning it off (blanking), is achieved by applying a blanking signal from the blanking circuit 34 to the control grid 26. It will be understood by one skilled in the art that such a blanking signal can also be applied to other appropriate electrodes to effect similar control of the beam. Amplifier 12 detects and inverts the unblank signal which has a blanking portion and an unblanking portion as shown in curve (a) of FIG. 3. The protective circuit 11 is responsive to the inputs of the inverted unblank signal from the output of amplifier 12 (curve (b) of FIG. 3) and of the detection signal of the sweep detection pulse generator 14 (curve (d) of FIG. 3). As will be explained in more detail below, an output failure signal is provided by the protective circuit 11 in less time than is required for the unblank portion of the unblank signal to occur regardless of the duration of that cycle.

The output failure signal can be used to initiate protective action to render the electron beam innocuous to the target 32. One method, as schematically shown in FIG. 1, is to cause a blanking signal to be applied to the control grid 26 to reduce the potential thereon. But it will be equally obvious to one skilled in the art that other methods can be used to disable the electron beam such as applying the output failure signal through a relay to initiate a blanking signal to be applied to the accelerating anode 28. This action causes the potential on accelerating anode 28 to collapse thereby preventing the high acceleration of the electron beam and preventing the electrons from impinging at a high velocity on the target 32.

Figure 2:
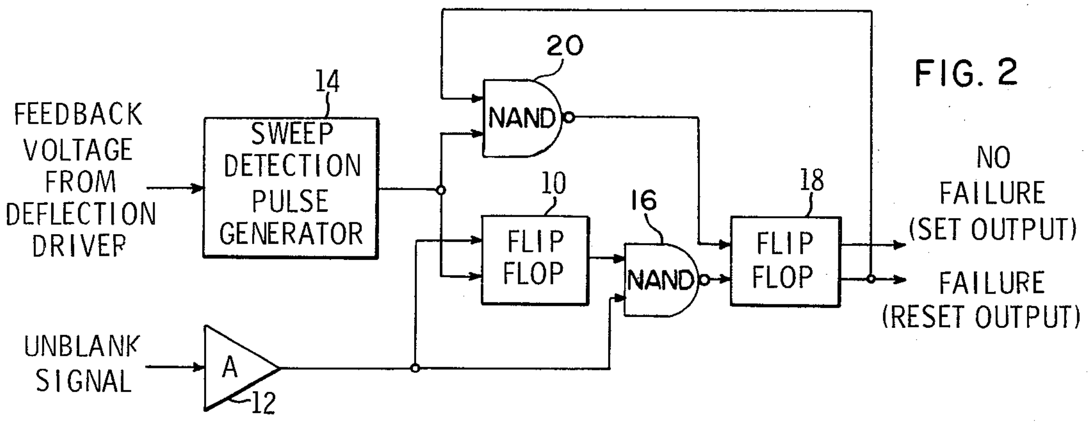
FIG. 2 is a block diagram of a protective circuit for cathode ray tubes embodying the present invention for single axis sweep detection.

The protective circuit of FIG. 2 includes a first FLIP-FLOP 10 which is operative in a first or a second output state. FLIP-FLOP 10 is initially set in the first output state at the start of each unblank signal of the CRT (which typically has a waveform as shown in curve (a) of FIG. 3) by the negative going edge of the inverted unblank signal output of amplifier 12, having a typical output waveform as shown in curve (b) of FIG. 3. Before the completion of one cycle of the unblank signal, the time varying feedback voltage (curve (c) of FIG. 3) from the deflection coils 30 of the electron beam device 22 triggers the sweep detection pulse generator 14 which resets the FLIP-FLOP 10 to its second output state. The output waveform of the sweep detection pulse generator 14 is shown in curve (d) of FIG. 3. The pulse generator 14 is triggered when the sweep signals reach some threshold value after initiation of each cycle of the sweep. The leading edge of the pulse output shown in curve (d) of FIG. 3 resets FLIP-FLOP 10 to its second output state so that in normal operation FLIP-FLOP 10 will only be in its first output state during the unblank portion of the unblank signal and for less duration than the period of the unblank portion. The result is that NAND gate 16, having one input connected from the output of FLIP-FLOP 10 and a second input connected from the output of amplifier 12, has the same positive gated output at the termination of the unblank portion of the unblank signal since the first input will then effectively be at zero potential. The output waveform of NAND gate 16 is shown in curve (f) of FIG. 3. A second FLIP-FLOP 18, which is operative in a first or a second output state and having a corresponding set and reset output, will remain in its first output state (see curve (g) of FIG. 3) as long as the output of NAND gate 16 does not drop to essentially zero. The first output state for FLIP-FLOP 18 is indicative, therefore, of no sweep voltage failure.

If there is no feedback voltage generated, i.e., there is a failure of the deflection driver, but the unblank signal continues to be generated, a different sequence of events occurs indicating a sweep failure. A failure of the feedback voltage is indicated by the dashed line in curve (c) of FIG. 3. When a sweep failure occurs FLIP-FLOP 10 still assumes its first output state in response to the negative going edge of the inverted unblank signal output of amplifier 12. But FLIP-FLOP 10 will remain in its first output state in the absence of a pulse output from the sweep detection pulse generator 14. Thus, when the inverted unblank signal switches positive at the end of the unblank portion of the unblank signal, the output of NAND gate 16 will go to near ground potential as shown by the waveform of curve (f) FIG. 3. FLIP-FLOP 18 will then be reset to it second output state indicated in curve (g) of FIG. 3 by the negative going signal at the output of NAND gate 16. The second output state of FLIP-FLOP 18 is indicative, therefore, of a sweep voltage failure and can be used to initiate protective action. Various means commonly known in the art could be used such as blanking the potential on accelerating anode 28, to disable the high voltage circuit of the cathode ray tube in response to the failure output indication of FLIP-FLOP 18.

FLIP-FLOP 18 will normally be set in its first output state except if reset to its second output state when the output of NAND gate 16 goes to near ground potential, Referring to FIG. 2 again, a second NAND gage 20 is placed in a feedback relation with the FLIP-FLOP 18, the output of NAND gate 20 setting FLIP-FLOP 18 in its first output state. The sweep detection pulse generator output is NANDED with the reset failure output of FLIP-FLOP 18 by NAND gate 20 so that FLIP-FLOP 18 will assume its first output state when the electron beam device 22 is initially turned on and operating properly.

This proposed protection circuit can be applied to any deflection system where sweep sampling is feasible (i.e., detection means for determining that the sweep has taken place, such as crossing a predetermined threshold). The circuit is based on the criteria that beam deflection must occur during each unblank portion of the unblank signal and consequently corrective action to protect the electron beam target can be initiated in less time than is required for a single cycle of the unblank portion of the unblank signal to occur regardless of the period of that cycle. Since loss of the unblank signal will not cause any damage to the electron beam target, no failure indication is given by this circuit should a momentary loss of unblank signal occur. False failure indications are thereby eliminated.

I claim as my invention:

1. In combination with an electron beam device including a target, a blanking circuit for providing an unblank signal having an unblank portion followed by a blank portion, and sweep signal generating means for deflection of the electron beam, a protective circuit comprising:

A. bi-stable means operable in a first and a second output state and being responsive to said unblank portion of said unblank signal for initially assuming said first output state, B. detection means responsive to said sweep signal for providing a detection signal only when said sweep signal exceeds a predetermined threshold, C. said bi-stable means being operably connected to said detection means for switching back to its second output state, in response to said sweep signal, and D. circuit means for providing an output failure signal if said bi-stable means remains in said first output state during the entire said unblank portion of said unblank signal.

2. The protective circuit of claim 1 wherein said protective circuit further includes gating means operably connected in feedback relationship to said circuit means and responsive to said detection signal and said output failure signal for preventing said output failure signal during start up of said sweep signal.

3. The protective circuit of claim 2 wherein said gating means includes a NAND gate responsive to said sweep signal and said failure output signal for generating an input signal indicative of no failure of said sweep output signal to said circuit means during start-up of said sweep signal.

4. The protective circuit of claim 1 wherein said protective circuit further includes an amplifier connected to said unblank circuit for inverting said unblank signal and operably connected to said bi-stable means.

5. The protective circuit of claim 1 wherein said detection means includes pulse generating means operably connected to said bi-stable means and being responsive to said sweep signal generating means to provide a detection signal only when said sweep signal exceeds a predetermined threshold.

6. The protective circuit of claim 1 wherein said protective circuit further includes means responsive to said failure signal to render said electron beam innocuous to said target of said electron beam device.

7. The protective circuit of claim 6 wherein said means responsive to said failure signal includes said blanking circuit.

8. A protective circuit for an electron beam device including a target and a sweep signal generating means for deflection of the electron beam comprising:

A. means for detecting said sweep signal only when said sweep signal exceeds a predetermined threshold and generating a detection signal in response thereto, B. control means including a blanking circuit for providing an unblank signal having an unblank portion followed by a blank portion, C. bi-stable means having a first and second output state responsive to said detection means and said control means such that said bi-stable means is initially set in said first output state by said unblank portion of said unblank signal and subsequently is reset in said second output state by said detection signal, and D. circuit means for providing an output failure signal if said bi-stable means remains in said first output state during the entire said unblank portion of said unblank signal.

9. The protective circuit of claim 8 wherein said protective circuit further includes gating means connected in feedback relationship to said circuit means and responsive to said detection signal and said output failure signal for preventing said output failure signal during start-up of said sweep signal.

10. The protective circuit of claim 8 wherein said protective circuit further includes means responsive to said failure signal to render said electron beam innocuous to said target of said electron beam device.

11. The protective circuit of claim 8 wherein said means for detecting said sweep signal includes pulse generating means operably connected to said bi-stable means and being responsive to said sweep signal generating means to provide a detection signal only when said sweep signal exceeds a predetermined threshold.

12. A circuit arrangement comprising:

A. an electron beam device having a target and an electron gun for generating an electron beam which impinges on said target, B. a blanking circuit operably connected to said electron beam device for providing an unblank signal having an unblank portion followed by a blank portion, C. sweep signal generating means operably connected to said electron beam device for deflection of said electron beam, D. detection means responsive to said sweep signal for providing a detection signal only when said sweep signal exceeds a predetermined threshold, and E. a protective circuit means responsive to said unblank signal and said detection signal for providing a failure output signal when said detection signal is absent during the entire said unblank portion of said unblank signal.

* * * * *